Jan. 4, 1966     L. E. BATES     3,227,325
METERING DISPENSER FOR PLASTIC MATERIALS
Filed June 26, 1963     2 Sheets-Sheet 2
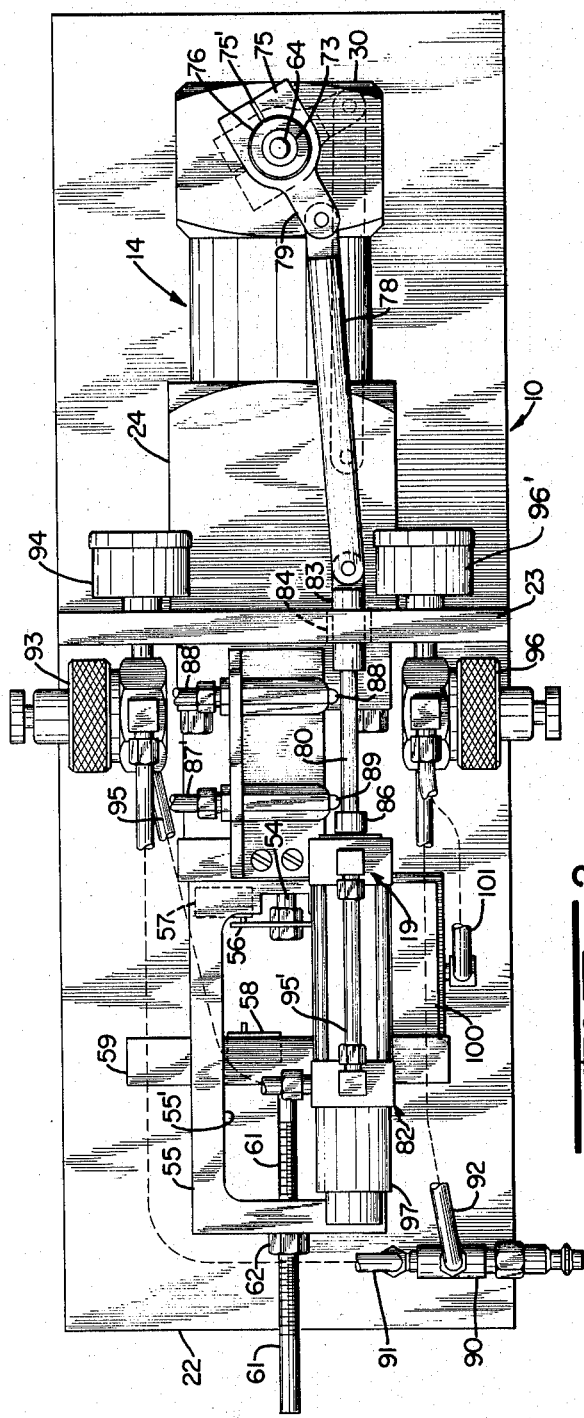
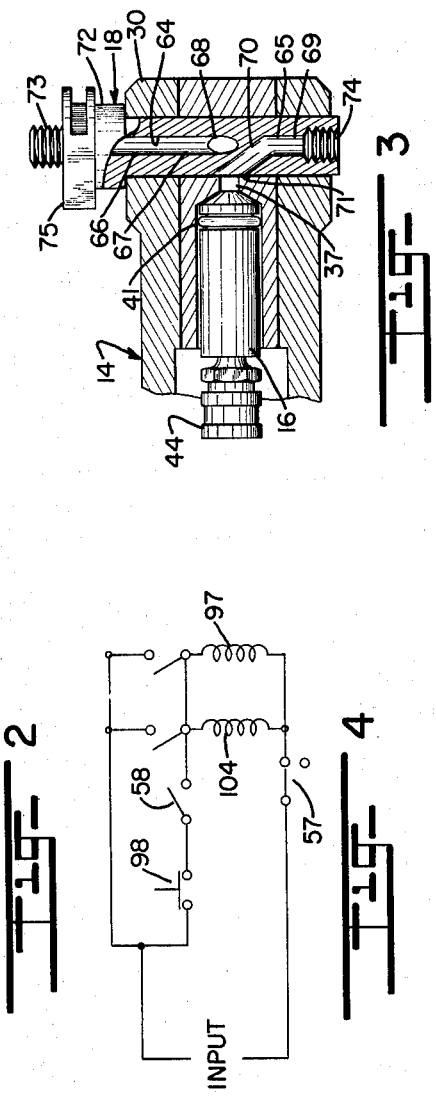
INVENTOR.
LEONARD E. BATES
ATTORNEY

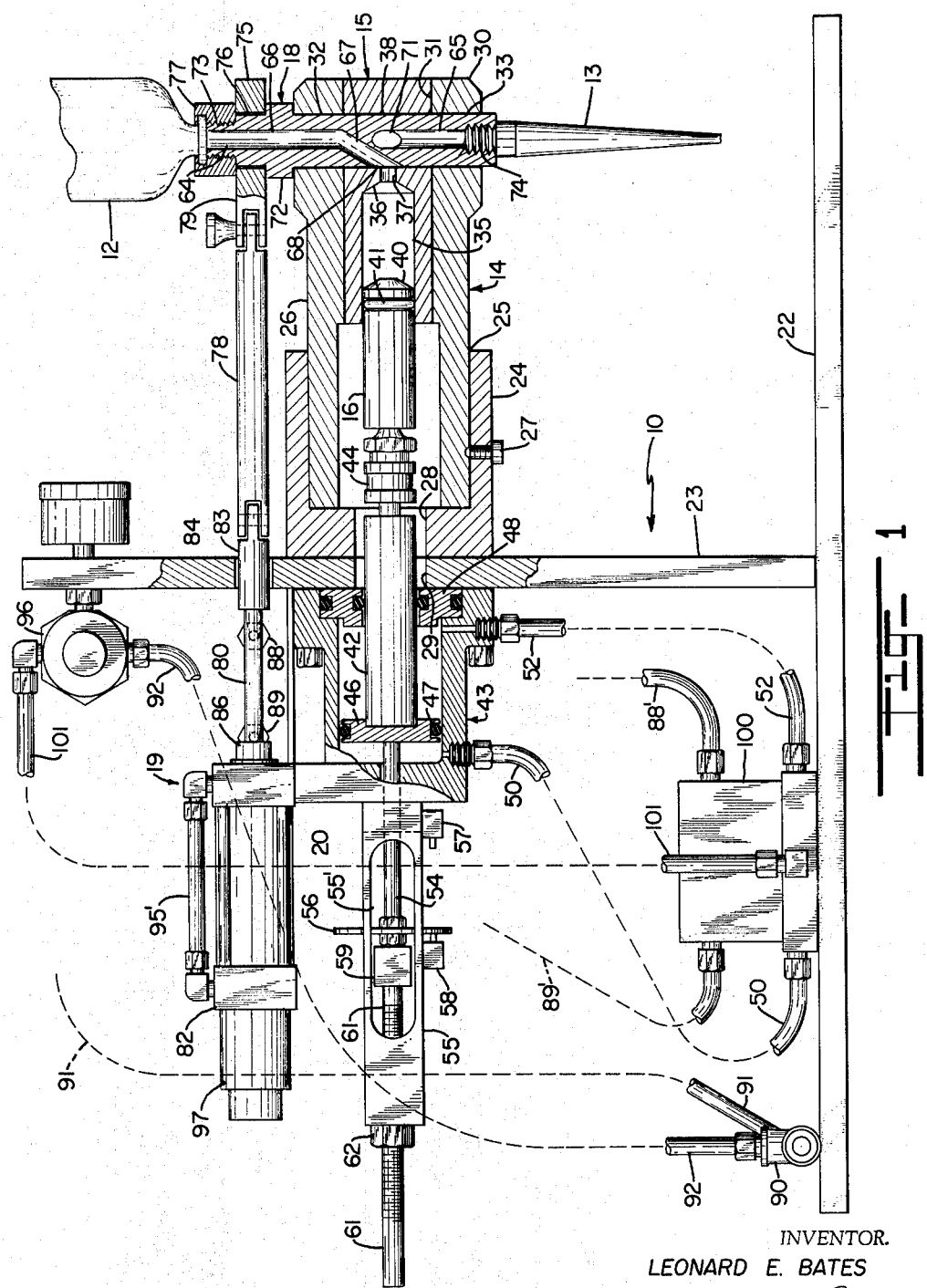

United States Patent Office 3,227,325
Patented Jan. 4, 1966

3,227,325
METERING DISPENSER FOR PLASTIC MATERIALS
Leonard E. Bates, 856 Quentin St., Aurora, Colo.
Filed June 26, 1963, Ser. No. 290,690
8 Claims. (Cl. 222—309)

This invention relates to new and improved dispensing apparatus and more particularly to apparatus for accurately metering and dispensing predetermined limited amounts of viscous liquid or plastic materials in rapid succession.

In numerous industrial operations there is a need for apparatus capable of delivering, both rapidly and consistently, accurate measured amounts of a liquid or plastic material. In this relation, it is desirable that the apparatus be easily adjustable with positive cut-off characteristics for accurately controlling the amount of liquid or plastic dispensed, as well as to be conformable for use in handling materials of different viscosities. Furthermore, in handling different materials, available equipment in the past has presented somewhat of a problem due to the difficulty of servicing and cleaning parts between runs or in changing over to different materials. For example, metering or dispensing apparatus is customarily employed in potting or encapsulating electrical and electronic parts with synthetic plastic or resinous materials. In applications of this type, the dispensing apparatus must be capable of selectively metering and dispensing the more viscous materials, either intermittently or in rapid succession, in a flowable condition while adjustable over a relatively wide range to handle and dispense quantities of different amounts according to the particular use. Moreover, the equipment should be lightweight and easily transportable with a minimum of parts for easy cleaning and servicing between operations, as well as being versatile in handling different types of materials according to the desired application and use.

Accordingly, it is a principal object of the present invention to provide dispensing apparatus for handling and dispensing predetermined quantities of liquid or plastic materials in a reliable and improved manner.

It is another object of the present invention to provide for improved dispensing apparatus incorporating a minimum number of parts along with minimum movement between parts and which can be easily assembled and disassembled for cleaning and replacement; moreover, wherein the apparatus is easily and accurately adjustable for metering and dispensing predetermined quantities of liquid or plastic materials of different viscosities and properties.

It is a further object of the present invention to provide for improved metering and dispensing apparatus which can be operated, adjusted and serviced with a minimum of skill required on the part of the operator; and which further can be controlled for intermittent or continuous dispensing of relatively small quantities of viscous materials with positive accurate delivery of a predetermined amount of material being assured during each dispensing operation.

It is a further object of the present invention to make provision in dispensing apparatus for a valve and metering cylinder so constructed and arranged as to be closely and accurately controllable for the successive supply and discharge of predetermined amounts of a liquid or plastic substance in a greatly improved yet simplified manner; and furthermore wherein the valve and metering cylinder constitute the only parts necessary for cleaning and servicing between operations so that the entire apparatus is highly efficient and time-saving in use.

It is a still further object of the present invention to make provision for metering and dispensing apparatus conformable for use in handling materials of different properties and characteristics and is specifically designed for dispensing rubber base and synthetic plastic materials in limited amounts or "shots," such as for example, adhesives, sealants, potting or encapsulating agents.

It is an additional object of the present invention to provide in a dispensing apparatus, of the type permitting volumetric measurement and positive displacement of the material to be dispensed, for a unitary valve construction and arrangement characterized for quick opening and closing with positive cut-off of the material after measurement and discharge to the intended point of use.

In accordance with the present invention, a vastly improved means for metering and dispensing liquids has been devised whereby exact measured amounts of the liquid are drawn or otherwise supplied directly into a displacement chamber, then immediately discharged therefrom under positive displacement to the intended point of use. The distance of travel for the liquid as well as the dwell time between measurement and discharge are maintained at an absolute minimum by means of a unique valve element which by a single movement will closely and accurately control liquid flow directly between the supply source, displacement chamber, and outlet. More specifically, the valve employs a double port arrangement aligned for quick successive movement into communication with the chamber to successively control supply and discharge of the material as well as to permit rapid opening and cut-off characteristics so as to assure more accurate metering and to minimize the time required between each cycle and each supply and discharge step within each cycle. An important feature is that flow control and displacement of the materials to be dispensed can be closely synchronized to conduct each run in a minimum amount of time which is particularly advantageous in handling quick-setting materials. Still another feature of the present invention is that a minimum number of parts are in direct contact with the liquid material and a minimum number of moving parts are used in controlling its flow, thus permitting ease of assembly and diassembly for cleaning and servicing both the metering elements and valve.

The above and other objects, advantages, and features of the present invention may become more readily appreciated and understood from a consideration of the following detailed description of a preferred embodiment of the present invention taken together with the accompanying drawings, in which:

FIGURE 1 is a side elevational view, partially in section, of a preferred form of dispensing apparatus with the valve and displacement head assembly being shown in a first supply position for delivery of liquid into the displacement chamber;

FIGURE 2 is a top plan view of the preferred form of invention shown in FIGURE 1; and FIGURE 3 is a side sectional view of the valve and displacement head assembly shown in a second discharge position for discharge of the material from the displacement head; and FIGURE 4 is a schematic illustration of a typical electrical control circuit utilized in operating the apparatus.

Referring in more detail to the drawings, there is shown by way of illustrative example a preferred form of dispensing apparatus 10 for metering and dispensing a liquid material from a supply cartridge 12 through a discharge nozzle 13. The preferred form of invention is specifically designed for the purpose of discharging in rapid succession limited amounts of a synthetic plastic or resinous material through the nozzle and the apparatus being automatically controlled to deliver a constant amount for each cycle of operation. Although not shown, this would have particular application to deposition of a potting or encapsulating agent onto a tray carrying a series of electrical or electronic parts advanced continuously beneath the discharge nozzle. The cartridge 12 is of course merely representative of any suitable source of supply for the resinous material and for example the supply source may take the form of any suitable tank or reservoir which is connected either directly above the apparatus or through a supply line into the apparatus in place of the cartridge. Broadly, a metering or displacement head assembly 14, including a metering cylinder 15 and piston or plunger 16, is constructed and arranged to cooperate with a valve 18 to successively draw measured amounts of material from the cartridge into the cylinder 15 when in the position shown in FIGURE 1; then to positively discharge that measured amount from the displacement cylinder through the nozzle 13 when in the position shown in FIGURE 3. By means of a valve actuator mechanism 19 and a metering control system 20, the valve 18 and piston 16 are closely synchronized in movement to quickly and successively supply and discharge of a measured amount of "shot" or liquid each cycle and to return to the initial position for the next cycle.

Considering in more detail the disposition and relationship between parts, the dispensing apparatus 10 is mounted on a base 22 and has a front panel 23 which forms the front wall of a housing, not shown, to enclose the principal parts comprising the valve actuator mechanism 19 and the metering control system 20. The front panel 23 also serves as a support for the displacement head assembly 14, the latter consisting of a generally cup-shaped holder 24 mounted on the front surface of the panel 23 and forming a horizontally facing cavity 25 for reception of a body portion as defined by the sleeve 26; suitable means such as a lock screw 27 may project inwardly through the wall of the holder against the outer surface of the sleeve 26 to hold it securely in place. In mounted relation, a reduced opening 28 is aligned with an opening 29 in the front panel for interconnection between the plunger 16 and control system 20 in a manner to be described. The sleeve 26 includes an enlarged generally rectangular head portion 30 with a central cylindrical opening 31 extending therethrough for insertion of the cylinder 15, and a pair of upper and lower aligned bores 32 and 33 extend transversely through the wall of the enlarged head 30 at one end of the opening 31. The metering cylinder 15 is dimensioned for close-fitting insertion through the opening 31 and with the front surface of the cylinder in flush relation with the front surface of the enlarged head 30. A main bore 35 extends through the greater length of the cylinder to define a working barrel or displacement chamber for the piston 16 and terminates in a front end wall 36 with a reduced counterbore 37 communicating with the opening 36 through the end wall to form a limited entrance into the chamber 35. A transverse opening 38 is of a diameter corresponding to that of the bores 32 and 33 in the head 30 so that by positioning the cylinder within the sleeve 26 with the opening 38 aligned with the bores 32 and 33, a common transverse passage is formed for insertion of the valve unit 18 vertically through the enlarged head 30 and directly opposite the chamber 36 and entrance bore 37.

In order to regulate the admission and discharge of liquid to and from the displacement chamber, the plunger 16 is dimensioned for close-fitting insertion within the chamber 35 and includes a forward end 40 tapered to conform in configuration to the end wall 36, together with an O-ring seal 41 adjacent the forward end to establish sealed engagement with the chamber wall. The stroke of the piston 16 is controlled by a push rod 42 which extends forwardly from a main control cylinder 43 and has a suitable snap-type connector or coupling 44 for detachable connection of the end of the piston 16. The main control cylinder 43 is preferably bolted to the back surface of the panel 23 in centered relation to the opening 29 and forms a chamber for horizontal movement of a piston head 46 secured to the end of the push rod assembly 42. The piston head 46 is provided with an exterior seal 47 and the push rod 42 moves through a bearing seal assembly 48 at the front end of the control cylinder so as to completely isolate the control cylinder pressure system from the forward displacement head assembly. Forward and return movement of the piston head 46 is regulated by pressure lines 50 and 52 positioned at opposite ends of the cylinder and which communicate with a main air pressure supply to be described.

In the preferred form, the amount of liquid supplied and discharged from the displacement chamber is determined by the stroke of the plunger 16 under the control of adjustable limiting means 54. To this end, a rod 54 extends rearwardly from the piston head 46 through the closed end of the cylinder 43 and through a hollow rectangular extension 55 attached to the end wall. A plate or disk 56 is connected to the end of the rod 54 for movement through longitudinal slots 55' in the extension 55 between a front stationary limit switch 57 and a rear adjustable limit switch 48. The rear limit switch 58 is positioned on a longitudinally adjustable abutment member 59 which is connected to a threaded control rod 61 extending rearwardly through a nut 62 attached to the end of the member 55. By rotating the rod 61, the abutment 59 and attached limit switch 58 can be advanced or retracted so as to control the extent of rearward movement of the plate and accordingly the rearward displacement of the plunger 16. The front limit switch is stationary and is positioned to permit forward movement of the plunger against the end wall 36 so that the plunger stroke is governed entirely by the setting of the abutment 59.

An important feature of the present invention resides in the construction of the valve element 18 and its disposition in relation to the displacement head assembly. As shown in the preferred form and particularly from a consideration of FIGURES 1 and 3, the valve 18 is of elongated cylindrical configuration and is sized for insertion through the transverse passage formed by the cylinder 15 and head 30 with just sufficient clearance between the elements to permit independent rotation or reciprocation of the valve. The valve consists of an upper inlet duct 64 including an axial bore 66 extending through the upper end of the valve and verging into an angular bore 67 which terminates in opening or port 68. Similarly a lower outlet or discharge duct 65 includes a lower axial bore 69 extending upwardly through the lower extremity of the valve into an angular bore 70 which terminates in opening or port 71. The ports 68 and 71 are located in circumferentially spaced relation to one another, and are horizontally aligned with the entrance bore 37 by a shoulder 72 adjacent to the upper end of the valve and which is seated on the top surface of the head 30. Additionally, the upper extremity of the valve is formed with a threaded male end 73 to permit connection of the cartridge 12, and the lower extremity has a threaded female end 74 for connection of the nozzle 13. In a manner to be described, the valve unit is movable by the valve actuator mechanism 19 between a first supply position in which the inlet port 68 establishes communication between the supply cartridge 12 and displacement chamber 35 and a second discharge position in which the discharge port 71 establishes communication between the displacement chamber 35 and discharge nozzle 13. As illustrated, the ducts 64 and 65 are preferably enlarged in relation to the entrance bore 37 so that the edges of the openings 68 and 71 will pass completely across the end of the entrance bore 37 in moving from one position to the other to assure positive cut-off and permit flow of dispensing material to and from the entrance bore between a fully open and fully closed position. In this relation, the ports 68 and 71 are shown spaced apart to effect complete closing or cut-off while traveling a minimum distance between the supply and discharge positions, and in the form illustrated are approximately 90° apart.

For the purpose of advancing or reciprocating the valve between the supply and discharge positions, the actuator mechanism 19 includes an annular connector 75 positioned over the upper end of the valve and against the top surface of the shoulder 72. Preferably, the valve is composed of a tetrafluoroethylene material manufactured and sold under the trademark "Rulon" by Dixon Corporation. "Rulon" is particularly useful since it is self-lubricating and resists any tendency of the synthetic plastic or resinous materials being dispensed to stick to the valve. However, for the reason that it is difficult to removably couple metal to "Rulon" parts, the connector 75 is formed with a radial slot 75', and an abrasive screen 76 formed of Carborundum extends inwardly from the slot between the valve and connector surfaces. The screen is clamped in place by means of an enlarged nut 77 threaded onto the reduced end 73 of the connector and by means of the abrasive contact afforded by the screen both with the "Rulon" and metal surfaces, rotation of the connector will be directly transmitted to the valve without slippage. A linkage element 78 serves to pivotally interconnect a horizontally projecting arm 79 of the connector 75 and the forward end of piston rod 80 extending from a control cylinder 82. The connecting rod 80 has an enlarged guide sleeve 83 extending through opening 84 in the front panel 23 so as to maintain the assembly in proper alignment, and a collar 86 at the opposite end of the rod 80 is engageable with front and rear limit valves 88 and 89, respectively, to control the directional movement of the entire actuator mechanism.

For the purpose of illustration, the plunger 16 is automatically synchronized in movement with the movement of the valve unit 18 by a combination electrical and pneumatic control system. Essentially, a main gate valve 90 admits compressed air from a compressed air source, not shown, for delivery through branch lines 91 and 92. Branch line 91 is connected to a pressure regulator 93 having a pressure gauge 94, and this may be generally defined as a low pressure regulator system for admitting air through line 95 to the cylinder 82. The cylinder 82 is illustrated as a solenoid actuated control cylinder, Model No. TSR–SR 3C manufactured by Compressed Air Service Company of Dayton, Ohio. Typically, the cylinder 82 includes a built-in valve at the junction of the pressure line 95 into the cylinder and which controls the admission of air either through a port located adjacent to the rear end wall of the cylinder or through auxiliary line 95' into a front port and ahead of the piston. As represented in FIGURE 4, solenoid 97 for the control cylinder is energized by closing a main switch 98 to actuate the built-in valve for cylinder 82 and to direct air under pressure from pressure line 95 through the rear port for advancing the piston therein; conversely, when the solenoid 97 is de-energized, the control valve is reversed to direct the air from pressure line 95 through auxiliary line 95' to retract the piston.

A high-pressure regulator 96 having a pressure gauge 96' is supplied with air from the branch line 92 for passage through line 101 to the lower end of distribution valve 100. The valve 100 may be of the type manufactured by Mead Specialties Company of Dayton, Ohio, identified as Model 400A, and controls admission of air through one or the other of pressure lines 50 or 52 into the displacement control cylinder 43 by activation of the limit valves 88 and 89 connected by control lines 88' and 89' to the valve 100. For instance, when the control cylinder 82 is actuated to advance the connecting rod 80 forwardly, the collar 86 will open the front limit valve 88 to release air from the main valve, and which action will cause air under pressure to be directed through pressure line 50 to force the piston head 46 forwardly through the cylinder 43. When the connecting rod 80 is retracted, however, the collar will depress the limit valve 89 to release air through control line 89' from the main valve so that air is forced through pressure line 52 to the front end of the metering control cylinder 43 to retract the piston head 46 and plunger 16.

As schematically illustrated in FIGURE 4, the electrical control circuit includes in addition to the solenoid 97 and main control switch 98 a latching relay 104 together with the limit switches 57 and 58. The limit switch 57 is a normally closed switch which when tripped by the plate 56 will break the circuit; and the switch 58 is normally open so that when tripped by the plate, upon retraction of the piston head and plunger, will close the circuit to permit the main control switch 98 to energize the latching relay 104 and the solenoid 97. Accordingly, at the beginning of each cycle of operation the displacement head assembly 14, valve 18 and control system would be in the relation shown in FIGURE 1 with the limit switch 58 being closed by the control plate 56. The cycle is initiated by depressing the main control switch 98 to energize the latching relay 104 and solenoid 97 to deliver air under pressure through line 95 into the control cylinder 82 so as to advance the piston for control rod 80. This movement will cause rotation of the connector 75 from the full line position shown in FIGURE 2 to the dotted line position thereby rotating the valve 18 from the position shown in FIGURE 1 to that shown in FIGURE 3 thereby to advance the discharge port 71 into alignment with the displacement chamber. As the connecting rod reaches its forward limit of travel, the control collar 86 will depress the front limit switch 88 as described so as to activate the high-pressure air system forcing air through pressure line 50 into cylinder 43 and causing the plunger 16 to advance through the main displacement chamber and to force material from the chamber through the lower discharge duct 65. When the piston head 46 has reached its forward limit of travel with the plunger against the end wall 36 within the chamber, simultaneously the disk 56 will have engaged the front limit switch 57 to open the circuit and to energize the solenoid 97, which upon return movement will reverse the directional flow of air into the cylinder 82. As a result, the valve actuator mechanism is retracted so as to reverse the rotation of the connector and valve 18 from the dotted line position shown in FIGURE 2 to the full line position; and of course this reverse movement will return the upper supply duct 64 into alignment with the main displacement chamber. Rearward movement of the rod 80 will then cause the collar 86 to open the limit valve 89, thus reversing the flow of air from the distribution valve 100 and causing air to flow through the pressure line 52 ahead of the piston head 46 to withdraw the plunger 16 from the main displacement chamber 35. As the plunger is withdrawn, the partial vacuum created will draw or induce liquid material from the supply cartridge 12 through the supply port into the displacement chamber, thus filling the displacement chamber. As the piston head is retracted during this stage of the operation, according to the position of the limit switch 58 the disk will depress the switch to close the circuit and enable the circuit for operation of the next cycle. In this way, it will be noted that each cycle must be completed before the next one is initiated so that accidental tripping or depression of the main control switch will not interrupt the cycle once started.

The amount of material drawn into the displacement chamber will of course depend on the stroke of the plunger 16 as controlled by the position of the limit stop 60. The plunger will always move forwardly against the front wall of the chamber to assure that for a given stroke of the plunger the same amount of fluid will be discharged each time; however, by permitting greater rearward displacement away from the forward wall by adjusting the abutment 59, greater amounts of material can be drawn into the chamber each cycle according to this setting. To repeat each cycle, the main control switch may be depressed to energize the solenoid as described, although of course this may be automatically set to run through a succession of delivery operations; and for example the main control switch may simply be held in the depressed or closed position to accomplish this, or the entire unit may be timer-controlled if it is desired to provide some delay time between each run.

An important advantage of the apparatus of the present invention resides in the construction of the valve 18 and displacement head assembly 14 which will permit rapid disassembly of parts for cleaning between each operation or change in liquid supply. For example, it is merely necessary to remove the connector 75 for the control arm, followed by removal of the valve unit 18 from the passage, then to withdraw the metering cylinder 15 from the outer sleeve portion 26. The outer sleeve is disassembled merely by loosening the lock screw 27 so as to complete disassembly of the parts. It will be noted that each of the elements described is of one-piece construction as to eliminate cleaning of interior moving parts. Also, the arrangement prevents material from entering into the rear control cylinder 43 and it will be observed also that the plunger has a quick disconnect so that it can be easily removed from the push rod for separate cleaning if desired.

From the foregoing, it will be evident that various modifications and changes may be made in the construction and arrangement of parts as well as the composition of materials employed according to the intended application and use without departing from the spirit and scope of the present invention as defined by the appended claims and reasonable equivalents thereof.

What is claimed is:

1. In a liquid dispensing apparatus having a metering cylinder for receiving and discharging predetermined amounts of liquid from a liquid supply source, the combination of a valve element traversing one end of said metering cylinder and having spaced supply and discharge ducts therein, said supply and discharge ducts terminating in circumferentially spaced supply and discharge ports, respectively, and said ports being aligned for successive movement into communication with said metering cylinder, said valve being movable between a first position in which said supply port is in communication between the liquid supply source and the metering cylinder for delivery of liquid to said cylinder and a second position in which said discharge port is in communication with said metering cylinder for discharge of the liquid therefrom, valve actuator means for selectively moving said valve between the first and second positions, and metering control means being responsive to the movement of said valve to admit a predetermined amount of liquid into said cylinder when said valve is in the first position and to discharge the liquid from said cylinder through said discharge duct when said valve is in the second position.

2. In a dispensing apparatus according to claim 1, said valve member having supply and discharge ducts being further characterized by being in the form of axial bores extending inwardly toward one another from opposite ends of said valve with angular bores forming continuations of the axial bores and terminating in said supply and discharge ports.

3. A dispensing apparatus for use in discharging metered quantities of liquid comprising a liquid supply source, a metering cylinder for receiving and discharging predetermined quantities of liquid delivered thereto, said cylinder being in communication with a transverse passage at one end thereof, an elongated cylindrical valve member rotatable in the passage including axially spaced delivery and discharge ducts therein, said delivery and discharge ducts terminating in circumferentially spaced delivery and discharge ports, respectively, and said ports being aligned for successive movement into communication with said metering cylinder, said valve being rotatable between a first position in which said delivery port is in communication between said supply source and the end of said metering cylinder and a second position in which said discharge port is in communication with the end of said metering cylinder, valve control means for moving said valve between the first and said positions, and metering control means for said metering cylinder including a piston therein movable toward and away from the end of said cylinder and being correlated with the movement of said valve to induce the flow of a metered quantity of liquid into said cylinder when said valve is in the first position and to discharge the liquid in said cylinder through said discharge port when said valve is in the second position.

4. A dispensing apparatus according to claim 3 being further characterized by said metering control means being responsive to movement of said valve to the first position to displace said piston rearwardly away from the end of said cylinder to induce the flow of liquid into said cylinder from said supply source, and said valve control means being responsive to the rearward displacement of said piston to move said valve to the second position whereupon said metering control means is activated to advance said piston forwardly through said cylinder for discharge of the liquid through said discharge port.

5. A dispensing apparatus according to claim 4, said metering control means including an adjustable limit stop to regulate the length of rearward displacement of said piston thereby to control the amount of liquid supplied to and discharged from said cylinder.

6. A dispensing apparatus for use in discharging metered quantities of liquid comprising a liquid supply source, a displacement head being in the form of a sleeve with a main cylindrical opening extending therethrough and a pair of transverse aligned openings extending through said sleeve into communication with the main cylindrical opening at one end thereof, and said metering cylinder being defined by an inner concentric sleeve inserted through the cylindrical opening in said displacement head with a transverse bore therein being aligned with the space transverse openings in said head to form a transverse valve-receiving passage, a cylindrical valve dimensioned for close-fitting removable insertion in the passage including spaced delivery and discharge ducts therein, said valve being rotatable between a first position in which said delivery duct is in communication between said supply source and the entrance bore and a second position in which said discharge duct is in communication with the entrance bore, valve control means for reciprocating said valve between the first and second positions, and metering control means for said metering cylinder including a piston therein being correlated with the reciprocal movement of said valve to induce the flow of a metered quantity of liquid into said metering cylinder when said valve is in the first position and to discharge the liquid in said cylinder through said discharge duct when said valve is in said second position.

7. In a dispensing apparatus, the combination of a metering head including a displacement chamber and a valve-receiving passage at the entrance to said chamber, a valve of elongated generally cylindrical configuration disposed in the passage, said valve including a pair of inlet and outlet ducts extending inwardly toward one another from opposite ends of said valve and terminating in ports at the surface of said valve circumferentially aligned with the entrance to said cylinder whereupon rotation of said valve the openings are alternately rotatable into communication with the entrance to said cylinder.

8. In a dispensing apparatus, the combination of a metering cylinder having a transverse passage at the entrance to said cylinder, a valve of elongated cylindrical configuration removably disposed in sealed relation in the passage, said valve including a pair of inlet and outlet ducts in the form of axial bores extending inwardly from opposite ends of said valve with angular bores defining continuations of the axial bores and terminating in circumferentially spaced inlet and outlet ports, respectively, said ports being circumferentially aligned opposite the entrance to said cylinder whereupon rotation of said valve the ports are alternatively rotatable into communication with the entrance to said cylinder.

References Cited by the Examiner

UNITED STATES PATENTS

| | | | |
|---|---|---|---|
| 1,795,307 | 3/1931 | Johnston | 222—372 X |
| 1,867,601 | 7/1932 | Stokes | 222—380 X |
| 2,376,838 | 5/1945 | Walter | 222—334 |
| 2,783,920 | 3/1957 | Negoro | 222—444 X |

M. HENSON WOOD, JR., *Primary Examiner.*

LOUIS J. DEMBO, *Examiner.*